June 16, 1964 L. V. GUEST 3,137,772

SOUND RECORDING AND REPRODUCING APPARATUS USING RECORD TAPES

Filed June 30, 1960 2 Sheets-Sheet 1

INVENTOR

Lawrence V. Guest

BY

Kemon, Palmer & Stewart

ATTORNEY

SOUND RECORDING AND REPRODUCING APPARATUS USING RECORD TAPES

Filed June 30, 1960 2 Sheets-Sheet 2

INVENTOR

Lawrence V. Guest

BY

Kemon, Palmer & Stewart

ATTORNEY

United States Patent Office 3,137,772
Patented June 16, 1964

3,137,772

SOUND RECORDING AND REPRODUCING APPARATUS USING RECORD TAPES

Lawrence Vincent Guest, Ampney, England, assignor to BSR Limited, a British company Filed June 30, 1960, Ser. No. 39,968
Claims priority, application Great Britain July 13, 1959
3 Claims. (Cl. 179—100.2)

Figure 1:
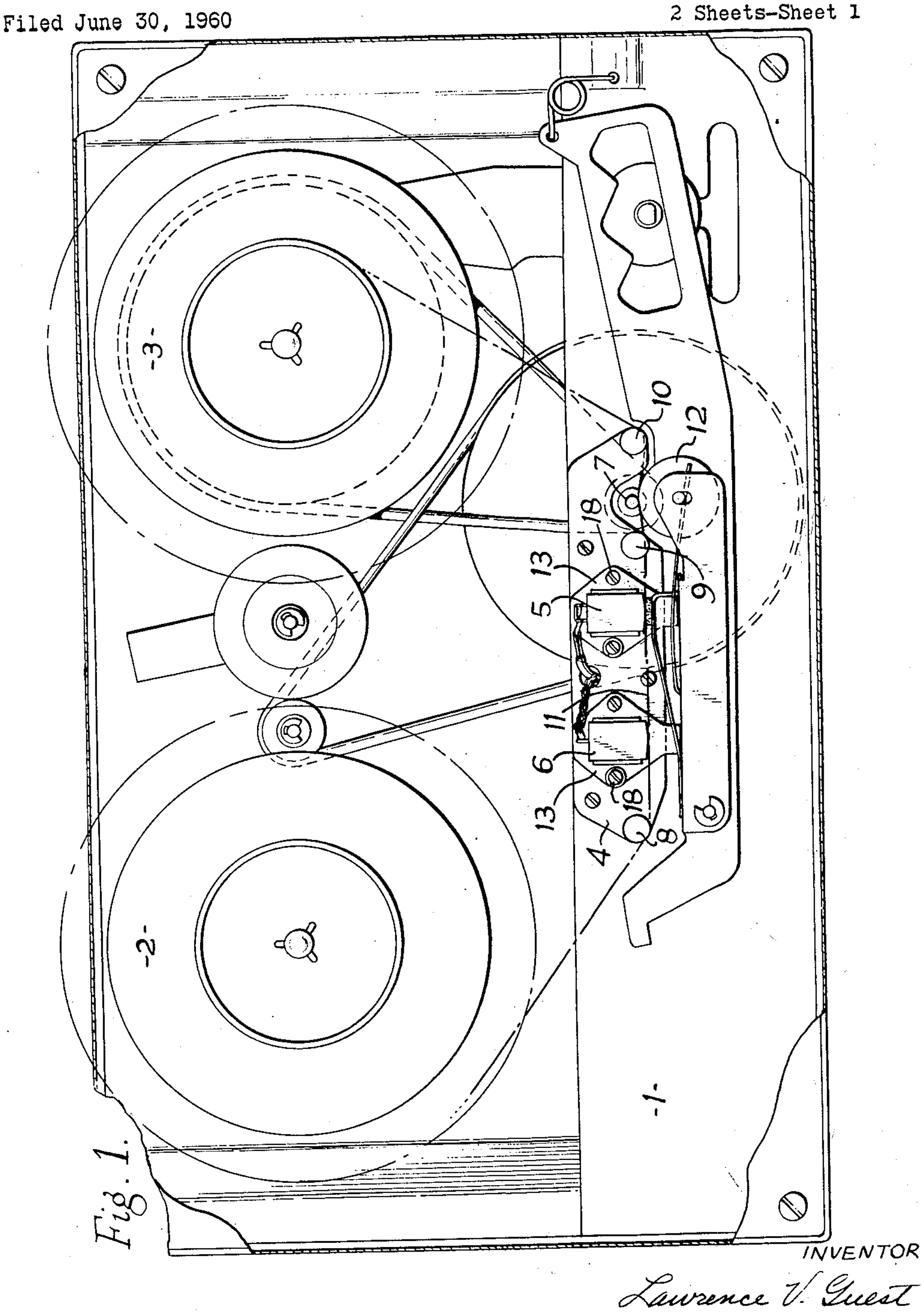

The present invention relates to sound recording and reproducing apparatus of the kind making use of magnetic record tapes hereinafter referred to as tape recorders.

In the use of such tape recorders the tape is guided to move across a small vertical gap between magnetic poles of a transducer head for the purpose of recording or reproducing.

It is usual also to provide a switch-controlled magnetic eraser head past which the guided tape is drawn before meeting the transducer head during a recording operation in order to erase any previously made record on the tape as a preliminary to the making of the required record, the eraser head being rendered ineffective during reproduction of a desired record. In some cases the eraser is embodied in the transducer head itself.

It is desirable in order to obtain optimum recording and reproduction that the tape shall make effective contact with all parts of the boundary or boundaries of the magnetic gap or gaps and it is a general aim to ensure that the angles made by parts of the tape with the plane containing the boundary of a magnetic gap as said parts approach and recede from the gap shall be such as to achieve effective "wrap" of the gap and it is usual for the angles of approach and departure to be made approximately equal.

As a further factor in achieving good recording and reproducing it is necessary for the magnetic gap or gaps to extend with accuracy across the face of and within small limits at right angles to the edges of the tape.

It is an object of the present invention to provide a mounting for the transducer and/or eraser heads of a tape-recorder whereby the above described advantageous dispositions of the heads relative to the path of travel of the tape may be readily obtained and set.

In accordance with the invention the transducer or other head is rigidly fixed on a metal or other rigid body provided on its under side with a knife edge for engagement with the surface of the plate or other support on which the head is to be mounted to form a fulcrum extending in the general direction normal to the operative face of the head and about which the head can be rocked, pins or holes or slots on or in said body spaced along the line of said knife edge with axes intersecting the angle of said knife edge for locating engagement with similarly spaced holes or slots or pins in or on the said plate or other support, and adjusting screws on opposite sides of said knife edge for co-operative adjusting and fixing engagement between said body and said plate or other support.

The engagement of the spaced pins in the correspondingly spaced holes or slots determines the direction of the fulcrum line and the direction of presentation of the operative face of the head containing the magnetic gap to the face of the part of the tape traversing the magnetic gap such direction usually being normal to that part of the face of the tape which is engaged with the head.

The pins are capable of limited rocking without translation in the holes or slots or the element containing the holes or slots capable of limited rocking without translation on the pins and in the preferred arrangement the pins are of decreasing diameter towards their free ends, the larger ends of the pins being a free fit in the smaller ends of the holes or slots. Alternatively the holes or slots are of increasing diameter or width in the direction away from their entry ends and in such case cylindrical pins may be used.

With the head and rigid body mounted in position the fixing screws may be separately adjusted to tilt the parts about the fulcrum formed by the knife edge to determine the direction of the elongated narrow magnetic gap relative to a line extending between the edges of the tape and normally at right angles to said edges and without significant alteration of the weight or vertical disposition of the magnetic gap with respect to the width of the tape and the position of the record track thereon.

Figure 2:
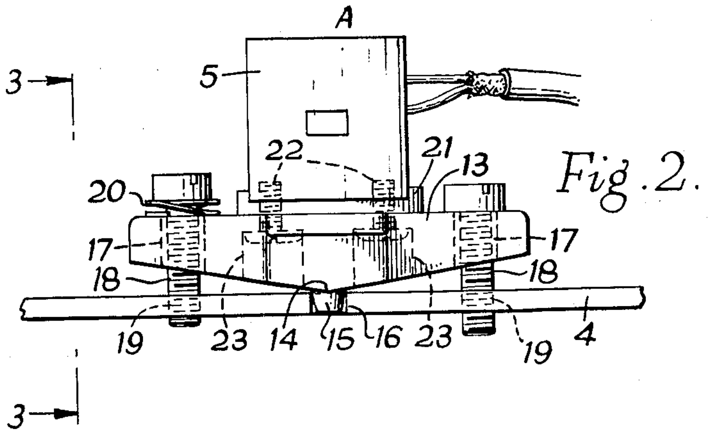
Figure 3:
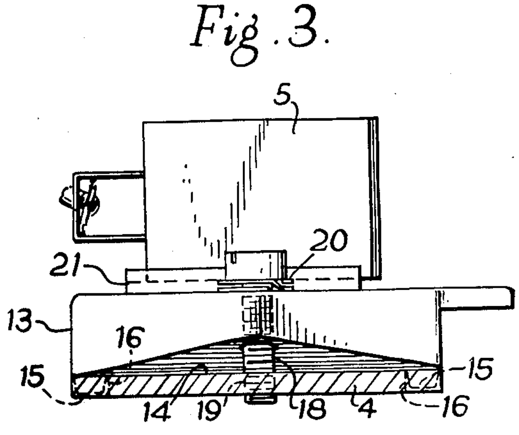

An embodiment of the invention is illustrated by way of example in the accompanying drawings in which:

FIG. 1 is a diagrammatic plan view of a tape recording and reproducing machine having a transducer head and an erasing head mounted therein in accordance with the invention, FIG. 2 is a view in front elevation and on a larger scale showing the method of mounting a head, and FIG. 3 is a view in end elevation looking from the left in FIG. 2.

Referring to FIG. 1 the machine illustrated comprises a base plate 1 and tape spools 2 and 3 mounted for rotation above the base plate 1, a bridge piece 4 mounted in fixed position on and above the base plate 1 and supporting a transducer head 5 and an erasing head 6, a capstan spindle 7 in fixed bearings on the base plate and rotatable at constant speed by a motor (not shown), guide posts 8, 9 and 10 in fixed position on the bridge piece 4 for guiding the loop of tape 11 between the spools 2 and 3 in its path of movement past the heads 5 and 6 on the bridge piece 4 and a pressure roller 12 for holding the tape 11 in driven contact with the capstan spindle 7 during recording or reproduction.

The path of movement of the tape 11 past the heads 5 and 6 in the case illustrated is approximately a straight line as determined by the guide posts 8 and 9 and the faces of the heads 5 and 6 contacted by the tape and in order to ensure effective "wrap" of the magnetic gaps by the tape the heads in this case are located with accuracy so that the angle of approach and the angle of departure of the tape to and from the magnetic gap of each of the heads shall be equal.

It is also required that the heads be located so that lines vertically bisecting the effective magnetic gaps of the heads as represented by the line marked A in FIG. 2 extend across the tape at right angles to the edges thereof.

In accordance with the invention the or each head is rigidly fixed on a metal body 13 shaped at its underside to provide a knife-edge 14 extending in the direction from back to front of the body 13 and the head mounted thereon for engagement with the surface of the fixed bridge-piece 4.

At or near each end of the knife edge 14 is provided a downwardly extending fixed pin 15 the axis of which intersects the line of the knife edge, said pins 15 being a locating fit in holes or slots 16 in the bridge piece 4, the holes 16 being in appropriate pre-formed location with respect to the guide posts 8 and 9, and spaced from one another by the same spacing as that between the pins 15 along the knife edge 14.

The pins 15 are of reducing diameter in the downward direction with their upper ends a free fit in the holes or slots 16.

Holes 17 are provided through the body 13 in symmetrical disposition on opposite sides of the knife edge 14 for the passage of adjusting screws 18 taking into threaded holes 19 in the bridge piece 4 and a compression spring 20 is preferably provided between the head of one of the screws 18 and the body 13.

The head 5 or 6 is rigidly coupled with the body 13 by engaging the lower end thereof in rebates in brackets 21 formed integral with the body 13 and fixing by screws 22 applied from below in counterbored holes 23 in the body 13.

To mount the head upon the bridge piece 4, the knife edge 14 is placed in contact with the surface of the bridge piece 4 and with the pins 15 engaged in the holes or slots 16, the attitude of the head across the bridge piece 4 and with reference to a line extending between the guide posts 8 and 9 being thus accurately determined.

The body 13 and head fixed thereon may now be rocked without translation about the fulcrum formed by the knife edge 14 as permitted by the tapered formation of the pins 15, by means of the screws 17 accurately into the desired position in which the line A bisecting the magnetic gap extends across the path of the tape loop 11 at right angles to the edges of the tape, the operation being facilitated by the presence of the spring 20. The rocking adjustment involves little or no variation of the height of the magnetic gap with respect to the width of the tape.

Instead of the pins 15 being tapered as in the case illustrated cylindrical pins may be utilised engaging and freely fitting in the upper ends of tapered holes in the bridge piece 4.

Again the locating pins may be provided in fixed spaced positions on the bridge piece and the holes for receiving the locating pins provided in the body 13 at or near each end of the knife edge 14.

I claim:

1. In a magnetic tape recorder and reproducer including a rigid base plate, means for mounting a transducer head on said base plate comprising: a rigid body rigidly connected with the underside of the transducer head; a knife edge on the underside of said rigid body, extending in a direction normal to the path of a tape past said transducer, and in fulcrum-forming engagement with the surface of said base plate; a plurality of pins on one member of the assembly which includes the said base plate and the said rigid body and in spaced distribution along and extending normal to said knife edge, means defining holes in the other member of the said assembly, receiving said pins, the root ends of said pins being a fit in one end of the holes and the free ends of said pins being rockable in the other ends of said holes; and adjusting screws on opposite sides of said knife edge, connecting said base plate and said rigid body and maintaining the required angular disposition of the rigid body relative to the base plate about the knife edge.

2. In a magnetic tape recorder and reproducer including a rigid base plate, means for mounting a transducer head on said base plate comprising: a rigid body rigidly connected with the underside of the transducer head; a knife edge on the underside of said rigid body, extending in a direction normal to the path of a tape past said transducer, and in fulcrum-forming engagement with the surface of said base plate; a plurality of tapered pins on said rigid body in spaced distribution along and extending normal to said knife edge, said pins tapering from their root ends toward their free ends; means defining holes in said base plate receiving said pins with the root end of each pin a free fit in one end of the respective hole in the said base plate; and adjusting screws on opposite sides of said knife edge, connecting said base plate and said rigid body and maintaining the required angular disposition of the rigid body relative to the base plate about the knife edge.

3. In a magnetic tape recorder and reproducer including a rigid base plate, means for mounting a transducer head on said base plate comprising: a rigid body rigidly connected with the underside of the transducer head; a knife edge on the underside of said rigid body, extending in a direction normal to the path of the tape past said transducer, and in fulcrum-forming engagement with the surface of said base plate, a plurality of tapering pins on said rigid body in spaced distribution along and extending normal to said knife edge, said pins tapering downwards from their root ends toward their free ends; means defining an equal number of holes in said base plate receiving said pins with the root end of each pin a free fit in one end of the respective hole in the said base plate; and adjusting screws extending loosely through said rigid body on opposite sides of said knife edge, threadedly engaging said base plate, and maintaining the required angular disposition of the rigid body relative to the base plate about the knife edge.

References Cited in the file of this patent

UNITED STATES PATENTS

| | | |
|---|---|---|
| 2,560,569 | Hare | July 17, 1951 |
| 2,678,971 | Barany | May 18, 1954 |
| 2,997,547 | Beachell | Aug. 22, 1961 |

FOREIGN PATENTS

| | | |
|---|---|---|
| 676,810 | Germany | June 12, 1939 |
| 828,014 | Germany | Jan. 14, 1952 |